June 12, 1956 W. S. CHEPIL 2,749,664
APPARATUS FOR EFFECTING THE FECUNDATION OF PLANTS
Filed Sept. 4, 1953 2 Sheets-Sheet 1
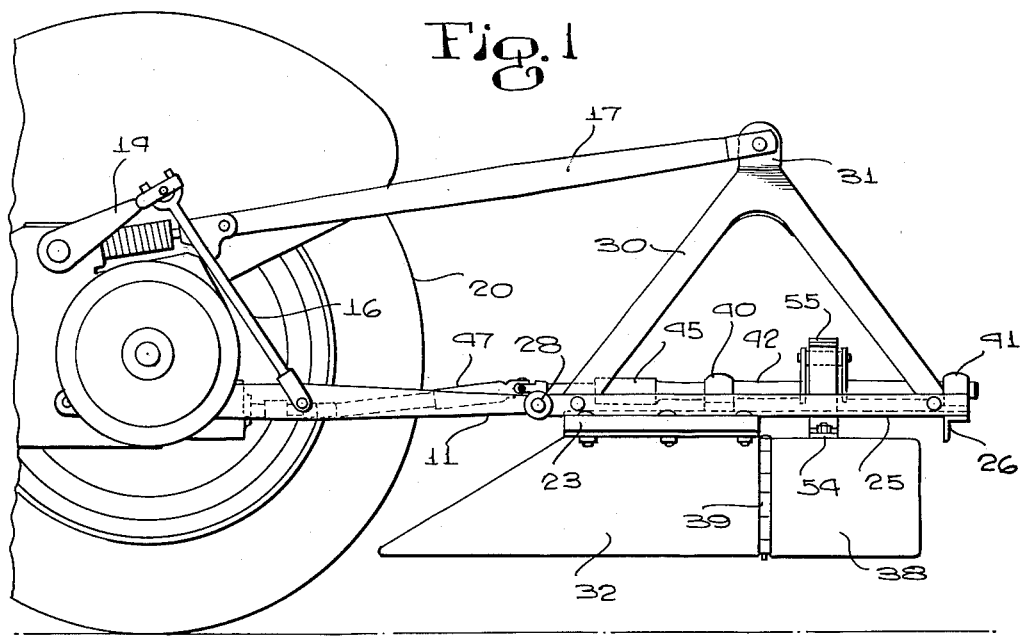
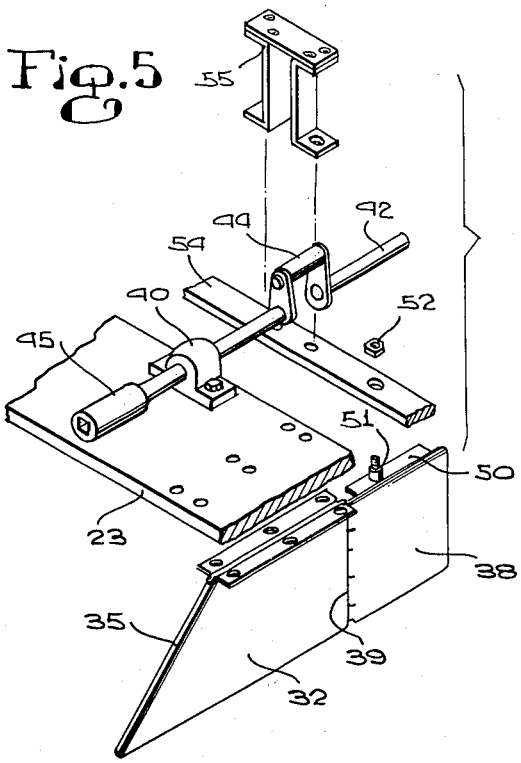
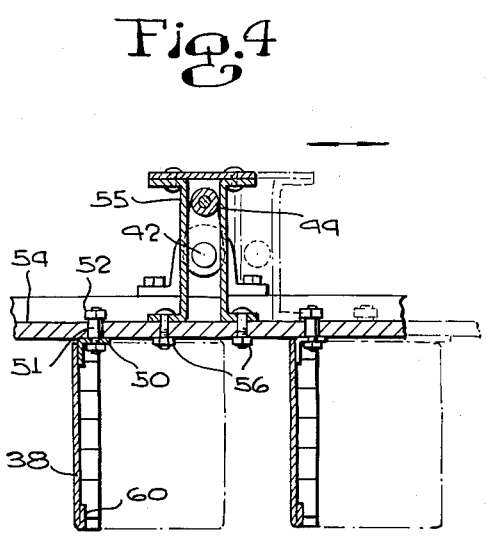
INVENTOR.
WILLIAM S. CHEPIL
BY
McMorrow, Berman & Davidson
ATTORNEYS June 12, 1956  W. S. CHEPIL  2,749,664
APPARATUS FOR EFFECTING THE FECUNDATION OF PLANTS
Filed Sept. 4, 1953  2 Sheets-Sheet 2

INVENTOR.
WILLIAM S. CHEPIL
BY
McMorrow, Berman + Davidson
ATTORNEYS

United States Patent Office 2,749,664
Patented June 12, 1956

2,749,664

APPARATUS FOR EFFECTING THE FECUNDATION OF PLANTS

William S. Chepil, Manhattan, Kans.

Application September 4, 1953, Serial No. 378,594

6 Claims. (Cl. 47—1)

This invention relates to apparatus for effecting the fecundation of plants and more particularly to a mobile machine for tripping alfalfa blooms and dispersing or scattering the pollen.

It is among the objects of the invention to provide an improved mobile machine for tripping the blooms of plants, such as alfalfa plants, for fecundation of the blooms, which machine applies to the plants while growing and in bloom a beating action sufficient to trip the blooms, but so applied as not to injure the plants, and to disperse the pollen; which divides the plants as the machine passes therethrough and applies the beating action to the sides of the plants; which may be towed by an agricultural tractor and derive its power from the tractor power take off or may be equipped with its own power plant, as may be desired; and which is effective to treat a large area of growing plants in a short time.

Other objects and advantages will become apparent from a consideration of the following description and the appended claims in conjunction with the accompanying drawings wherein:

Figure 1 is a side elevational view of a machine illustrative of the invention with a rear portion of a machine towing and driving tractor fragmentarily illustrated;

Figure 4 is a cross sectional view on the line 4—4 of Figure 3; and

Figure 5 is a fragmentary exploded perspective view showing structural details of the machine.

Figure 2:
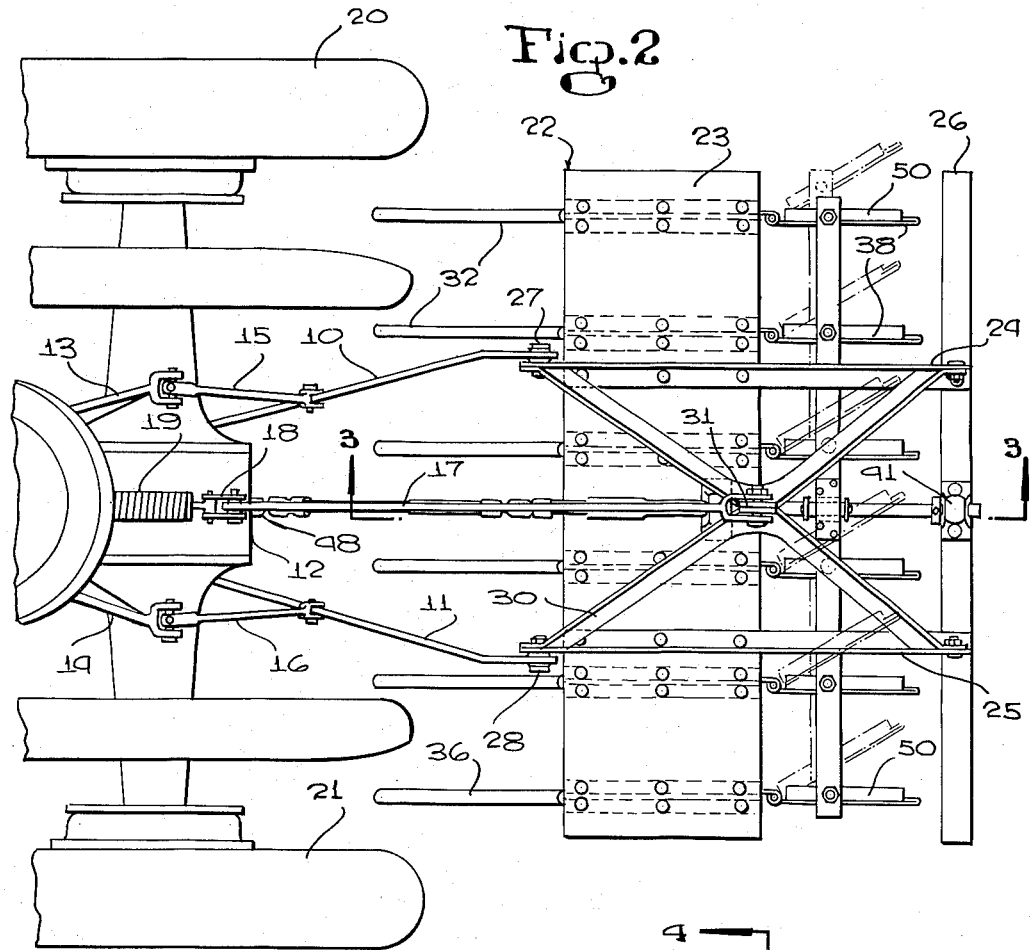
Figure 2 is a top plan view of the machine and tractor portion illustrated in Figure 1.
Figure 3:
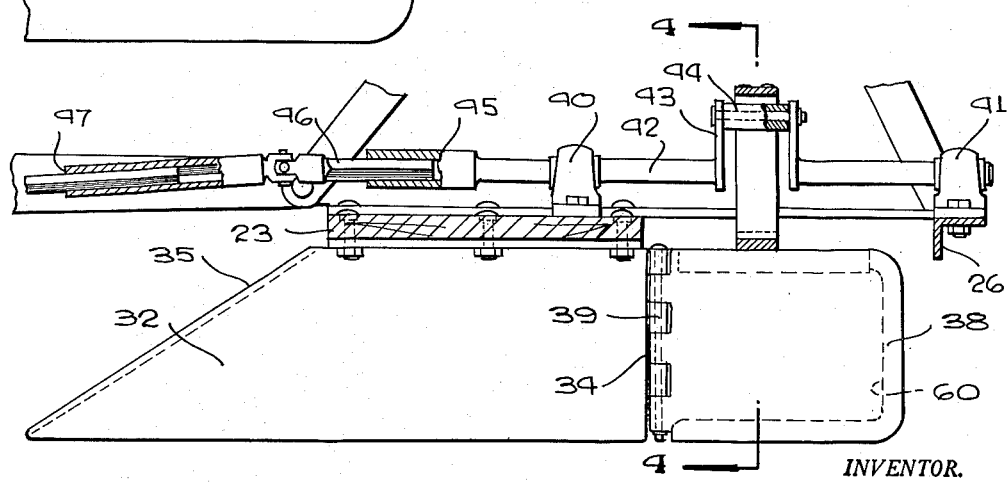
Figure 3 is a cross sectional view on an enlarged scale on the line 3—3 of Figure 2.

With continued reference to the drawings, the agricultural tractor illustrated has an implement lift and depth control mechanism including tension links 10 and 11 extending rearwardly from the rear axle 12 of the tractor and raised and lowered by lift arms 13 and 14 connected at their distal ends to the tension links 10 and 11 intermediate the length of these links by the connecting rods 15 and 16, and a compression link 17 disposed between and above the tension links 10 and 11 and connected at its forward end to a valve mechanism 18 which controls the hydraulic mechanism connected to the lift arms 13 and 14 in a manner well known to the art, forward movement of the compression link 17 being resisted by a compression spring 19 interposed between the front end of the link 17 and an abutment fixed on the top portion of the tractor rear axle 12.

The rear axle 12 of the tractor is supported on the rear drive wheels 20 and 21 and, as the tractor is of a form well known to the art, a more detailed illustration and description is considered unnecessary for the purposes of the present disclosure.

The plant treating machine has a frame, generally indicated at 22, which includes a flat plate 23 of elongated, rectangular shape, angle bars 24 and 25 extending transversely across the plate 23 and beyond the side edges of this plate in spaced apart and parallel relationship to each other and at substantially equal distances from the mid-length location of the plate and a frame bar 26 connected to the rear ends of the bars 24 and 25 and disposed in spaced and parallel relationship to the rear side edge of the plate 23. The front ends of the bars 24 and 25 are provided with pivotal connectors 27 and 28 by means of which the rear ends of the tension links 10 and 11 of the tractor are pivotally connected to the front ends of these frame bars.

A frame structure 30 of pyramidal shape has four legs diverging downwardly and outwardly from a centrally located lug 31 disposed above the plate 23 and connected at their ends remote from the lug 31 to the frame bars 24 and 25 at the corresponding ends of these frame bars. The rear end of the tractor compression link 17 is pivotally connected to the lug 31 and the implement lift and depth controlling mechanism of the tractor is effective to maintain the machine frame in a substantially horizontal position at a predetermined distance above the surface of the ground on which the rear wheels 20 and 21 of the tractor rest.

A plurality of separator plates 32 are secured at their upper edges to the frame plate 23 and depend from this frame plate substantially in uniformly spaced apart planes which are perpendicular to the side edges and the face surfaces of the frame plate, so that the separator plates depend vertically from the horizontally disposed vehicle frame, substantially perpendicular to the frame, and extend longitudinally in a fore and aft direction relative to the frame and the associated tractor.

The separator plates 32 have rear edges substantially vertically disposed and depending from the rear side edge of the frame plate 23 and have bottom edges disposed substantially parallel to the plane of the frame 22 and extending forwardly from the front side edge of the frame plate 23. The top edges of these separator plates are inclined downwardly and forwardly, as indicated at 35, from the front side edge of the frame plate 23 to the front ends of the bottom edges of the separator plates and the forwardly and downwardly inclined edge portions of the separator plate are preferably covered by transversely rounded protector strips 36, which may be formed of a suitable resilient material, such as rubber. The width of the separator plates 32 is such that, with the frame plate 23 disposed slightly above the tops of growing alfalfa plants, the bottom edges of the separator plates will be disposed near the ground and somewhat below the bloom carrying portions of the plants.

Vanes 38 of rectangular shape are vertically disposed, one adjacent to the rear end of each of the separator plates 32, and each vane 38 is connected along its front edge to the rear edge of the associated separator plate for swinging movement about a vertical axis as by a hinge formation 39 having an axis perpendicular to the plane of the machine frame 22. These vanes extend from the rear ends of the separator plates 32 substantially to the rear crossbar 26 of the frame and are swingable about their hinge connections with the rear ends of the associated separator plates to apply a beating action to growing plants passing between the separator plates as the machine is pulled across a field of growing plants.

A journal pillow block 40 is mounted on the top of the frame plate 23 at the mid-length location of this plate and near the rear side edge thereof and a similar pillow journal block 41 is mounted on the rear frame bar 26 at the mid-length location of this frame bar. A crankshaft 42 extends through and is journaled in the journal blocks 40 and 41 and is provided between the blocks 40 and 41 with a crank 43 having a cylindrical roller 44 on its crank pin. The crankshaft extends forwardly of the front journal bearing or block 40 and is provided at its front end with an elongated socket structure 45 having a bore of square or non-circular shape which receives the rear portion 46 of a drive shaft 47 the front end of which is connected to the tractor power take off connection 48, so that the crankshaft is driven by the power take off connection of the associated tractor.

As drive shafts for connecting tractor power take off connections to the driving connections of agricultural implements are old and well known to the art, a detailed illustration and description of this drive shaft is not considered necessary for the purposes of the present disclosure.

An angle iron rib 50 extends along the top edge of each of the vanes 38 and is rigidly secured to the corresponding vane and a pin 51 extends upwardly from each rib 50 and is provided at its upper end with a screw threaded portion receiving a nut 52. The pins 51 are all located at equal distances from the axes of the corresponding hinge connections 39 and a flat actuating bar 54 extends across the top edges of the vanes 38 and is provided with apertures spaced apart longitudinally thereof which receive the pins 51. When the bar 54 is reciprocated, the vanes 38 will be swung back and forth or oscillated about their hinge connections with the corresponding separator plates 32.

A hollow bracket 55 of elongated, rectangular shape, is secured on the bar 54 at the mid-length location of the bar by suitable means, such as the bolts 56, and extends upwardly from the actuator bar. The bearing sleeve or roller 44 on the crank pin of the crankshaft 42 is disposed in the bracket 55 and, as the crankshaft is rotated, the crank pin of the crankshaft imparts reciprocating movement to the actuator bar 54 through the intermediacy of the bracket 55.

As the machine is pulled over an area of growing alfalfa in bloom, the separator plates 32 separate the plants into rows which pass through the spaces between adjacent plates, and as the plants emerge from the rear ends of these spaces they are subjected to a beating action by the vanes 38 of sufficient force to trip the plant blooms, but which does not materially injure the plants, and to disperse or scatter the pollen, the dispersion of the pollen being effected by the impact of the vanes against the plants and movement of the air caused by the rapid oscillation of the vanes. The rear and bottom edges of the vanes 38 are preferably covered by smooth protective formations as indicated at 60, of transversely rounded shape, which may be either strips of resilient material, such as rubber, bound around the edges of the vanes, or folded over edge portions of the vane material.

While the machine illustrated is shown as having six spaced apart separator plates and a corresponding number of beater vanes, it is to be understood that the number of plates may be increased to any practical extent, so that the machine will cover a large area at each passage of the machine and associated tractor across a field of growing plants. Also, while a machine has been illustrated which is driven from the power take off connection of a machine carrying tractor, it is to be understood that a power plant, such as a small gasoline engine, can be mounted on the machine frame and drivingly connected to the crankshaft to drive the machine, if desired.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A machine for tripping blooms on growing plants comprising a frame adapted to be carried by an associated agricultural tractor, separator plates secured to and depending from said frame and disposed substantially in planes which are uniformly spaced apart and parallel to each other and perpendicular to the plane of said frame, each of said plates having a substantially vertically disposed rear edge, vanes hingedly connected at their front edges to the rear edges of said separator plates and extending rearwardly one from each separator plate, and power operated means mounted on said frame and drivingly connected to said vanes to impart to said vanes oscillating movements about the axes of the hinge connections between said vanes and the corresponding separator plates.

2. A machine for tripping blooms on growing plants comprising a frame adapted to be carried by an associated agricultural tractor, separator plates secured to and depending from said frame and disposed substantially in planes which are uniformly spaced apart and parallel to each other and perpendicular to the plane of said frame, each of said plates having a substantially vertically disposed rear edge, vanes hingedly connected at their front edges to the rear edges of said separator plates and extending rearwardly one from each separator plate, and power operated means mounted on said frame and drivingly connected to said vanes to impart to said vanes oscillating movements about the axes of the hinge connections between said vanes and the corresponding separator plates, said power operated means comprising a crankshaft extending transversely of and journaled on said frame, an actuator bar pivotally connected to said vanes at the top edges of said vanes and rearwardly of the hinge connections between said vanes and said separator plates, and a bracket mounted on said actuator bar and receiving the crank of said crankshaft.

3. A machine for tripping blooms on growing plants comprising a frame adapted to be carried by an associated agricultural tractor, separator plates secured to and depending from said frame and disposed substantially in planes which are uniformly spaced apart and parallel to each other and perpendicular to the plane of said frame, each of said plates having a substantially vertically disposed rear edge, vanes hingedly connected at their front edges to the rear edges of said separator plates and extending rearwardly one from each separator plate, and power operated means mounted on said frame and drivingly connected to said vanes to impart to said vanes oscillating movements about the axes of the hinge connections between said vanes and the corresponding separator plates, said separator plates having bottom edges disposed below and parallel to the plane of said frame and extending forwardly beyond the front edge of said frame and top edges inclined forwardly and downwardly from the front edge of said frame to the front ends of the bottom edges of the corresponding separator plates.

4. A machine for tripping blooms on growing plants comprising a frame adapted to be carried by an associated agricultural tractor, separator plates secured to and depending from said frame and disposed substantially in planes which are uniformly spaced apart and parallel to each other and perpendicular to the plane of said frame, each of said plates having a substantially vertically disposed rear edge, vanes hingedly connected at their front edges to the rear edges of said separator plates and extending rearwardly one from each separator plate, and power operated means mounted on said frame and drivingly connected to said vanes to impart to said vanes oscillating movements about the axes of the hinge connections between said vanes and the corresponding separator plates, said frame comprising a flat plate of elongated rectangular shape, bars extending across and beyond the side edges of said plate substantially perpendicular to said side edges and at substantially equal distances from the mid-length location of said plate, a rear bar carried by said angle bars in spaced and parrallel relationship to the rear edge of said plate, and a frame structure of pyramidal shape mounted on and extending above said angle bars and carrying at its upper end a lug formation adapted to be connected to the rear end of the compression link of an associated tractor, the front ends of said angle bars being adapted to be connected to the rear ends of the tension links of the tractor.

5. A machine for tripping blooms on growing plants comprising a frame adapted to be carried by an associated agricultural tractor, separator plates secured to and depending from said frame and disposed substantially in planes which are uniformly spaced apart and parallel to each other and perpendicular to the plane of said frame, each of said plates having a substantially vertically disposed rear edge, a vertically disposed vane arranged rearwardly of each of said plates and connected to the rear edge of the adjacent plate for swinging movement about a vertical axis, and power operated means on said frame and operatively connected to said vanes for effecting the swinging movement of said vanes.

6. A machine for tripping blooms on growing plants comprising a frame adapted to be carried by an associated agricultural tractor, separator plates secured to and depending from said frame and disposed substantially in planes which are uniformly spaced apart and parallel to each other and perpendicular to the plane of said frame, each of said plates having a substantially vertically disposed rear edge, a vertically disposed vane arranged rearwardly of each of said plates and connected to the rear edge of the adjacent plate for swinging movement about a vertical axis, means connecting said vanes together, and power operated means on said frame and operatively connected to said means for effecting the swinging movements in unison of said vanes.

References Cited in the file of this patent

UNITED STATES PATENTS

| | | |
|---|---|---|
| 503,434 | Neal | Aug. 15, 1893 |
| 1,643,149 | Benjamin | Sept. 20, 1927 |
| 1,866,219 | Nielsen | July 5, 1932 |
| 2,223,002 | Ferguson | Nov. 26, 1940 |

FOREIGN PATENTS

| | | |
|---|---|---|
| 170,170 | Austria | Jan. 25, 1952 |
| 48,422 | Denmark | Feb. 10, 1934 |